S. W. WILKINSON, W. GREGORY & E. C. & R. JENKINS.
SPRING LOCKING WASHER.
APPLICATION FILED MAY 15, 1909.
966,973.
Patented Aug. 9, 1910.
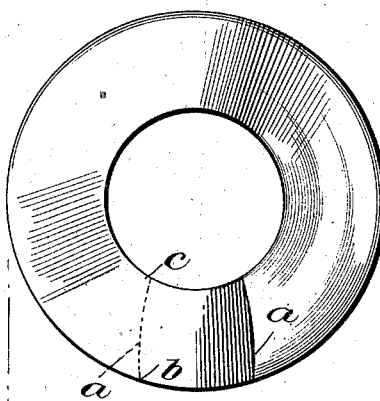
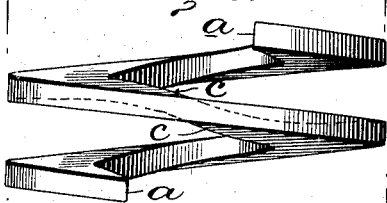
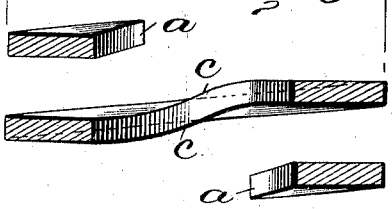

UNITED STATES PATENT OFFICE.

SYDNEY WILLIAM WILKINSON AND WALTER GREGORY, OF HATHERSAGE, NEAR SHEFFIELD, AND EDWARD COTTRELL JENKINS AND ROBERT JENKINS, OF BIRKENHEAD, ENGLAND.

SPRING LOCKING-WASHER.

966,973.  Specification of Letters Patent.  Patented Aug. 9, 1910.

Application filed May 15, 1909. Serial No. 496,289.

*To all whom it may concern:*

Be it known that we, SYDNEY WILLIAM WILKINSON, WALTER GREGORY, EDWARD COTTRELL JENKINS, and ROBERT JENKINS, subjects of the King of Great Britain and Ireland, residing, respectively, at Hathersage, near Sheffield, in the county of Derby, and Birkenhead, in the county of Chester, England, have invented Improvements in Spring Locking-Washers, of which the following is a specification.

This invention relates to spring locking washers for screw bolts, studs, and the like, and other purposes.

It has heretofore been proposed to manufacture spring washers from strips of ribbon steel the ends of which are tapered or made wedge shape for the purpose of having the bearing faces of the washer parallel to each other; other coiled washers have also been made of ribbon steel of a uniform cross section throughout, and which, to produce parallel bearing faces have had a kink formed therein, in the process of manufacture, thus the helix of the coil was not continuous throughout but joggled at one portion in order to form the kink and consequently such a washer is liable to fracture at this part on being tightly compressed. In order that the ends of spring washers shall engage the underside of a nut or other part against which they bear some such washers have had their ends so formed that they project outwardly.

Now the object of this invention is to provide improved washers of this helically coiled spring type in which the disadvantages of the constructions heretofore known are obviated without increasing the expense of manufacture.

The outer periphery of a spring locking washer according to this invention retains the ordinary helically wound or screw like form but the intrados, or inner marginal portion thereof, is formed with a kink or slight curvature such that the steel strip or ribbon of which the washer is formed is level at the ends of the kinked or curved part, that is to say at such parts it extends at right angles to the axis of the bolt or the like it surrounds when in use. The kink or slight curvature is formed within the width of the steel strip or ribbon and vanishes at the outside edge thereof so that the fibers of the metal undergo but slight distortion, and when the washer is in use its free ends tend to slightly embed themselves in the respective surfaces against which they bear.

The improved spring washer comprises in some cases more than one complete coil in spring form the end portions of which project outwardly so as to engage with the underside of a nut in a known manner for preventing the nut from turning in a direction to become unscrewed. The ends of the washer are cut at such an angle that when the washer is hard down said ends will be clear of the kinked or curved portion of the intermediate coil. It will thus be understood that in the event of parts secured together by bolts fitted with the improved locking washers becoming slack after the bolt nuts have been tightened hard up, owing it may be to deterioration of one or both of the parts so secured, the washer will expand to allow for this, but the ends of the coil will however still bear tightly on the nut and prevent it from becoming unscrewed unintentionally.

Figure 1 of the accompanying drawings is a plan of the improved washer. Fig. 2 is an elevation of same in its normal or free position. Fig. 3 shows the improved washer in its normal or free position in central vertical section, showing the portion of the coil in which the kink is formed as seen from the inside.

The strip of steel or other suitable metal from which the improved spring washers can be made is preferably in ribbon or tape form of an equal cross section throughout.

As will be seen in Fig. 1 the ends $a$ of the spring are slightly curved, this is caused by the rolling or coiling operation notwithstanding that the ends of the metal strip blank from which the washer is formed are each cut at an angle of 45°.

The circumferential distance $b$ between the ends is sufficient to allow for the kink or distortion $c$ on the intrados or inner marginal portion of the washer, such kink diminishing to nothing at the outer periphery of the washer as shown in Figs. 2 and 3.

The formation of the kink is such that the ends of the washer when the washer is compressed to its full extent tend to press outwardly so that they will tend to slightly embed themselves into a nut, or the head of a set screw, and the base on which the washer rests, even when the nut or set screw is partially unscrewed, thus forming a permanent locking washer to ordinary screw threaded nuts.

In applying a spring locking washer to a bolt which is intended to secure say fish plates on each side of a piece of timber, the timber may shrink and with the ordinary spring washer having a flat bearing surface would allow the nut to become slack, whereas with the improved locking washer when allowed to expand some distance through any cause, the ends will still be in advance of the body part and bear against the nut and other face, thus preventing unscrewing of the nut through vibration and the like.

What we claim is:—

1. A spring locking washer formed from a strip of ribbon steel coiled helically, having a kink on the intrados or inner marginal portion thereof and the outer periphery of which is not kinked.

2. A spring locking washer formed from a strip of ribbon steel coiled helically and having a kink on the intrados or inner marginal portion thereof, said kink being formed within the width of the strip and vanishing at the outer periphery.

3. A locking washer composed of a helically coiled strip of spring metal having its ends arranged adjacent to each other, said strip having a kink at its inner marginal portion and vanishing at the outer periphery thereof, said kink being located adjacent to said ends and about midway the length of the strip.

Signed by SYDNEY WILLIAM WILKINSON and WALTER GREGORY at Sheffield England this 27th day of April 1909.

SYDNEY WILLIAM WILKINSON.
WALTER GREGORY.

Witnesses:
LUTHER J. PARR,
CHAS. N. DANIELS.

Signed at Tower Buildings, Liverpool this 22nd day of April 1909 by EDWARD COTTRELL JENKINS and ROBERT JENKINS.

EDWARD COTTRELL JENKINS.
ROBERT JENKINS.

Witnesses:
F. M. C. SCOTT,
H. WILLIAMS.